Figure 1:
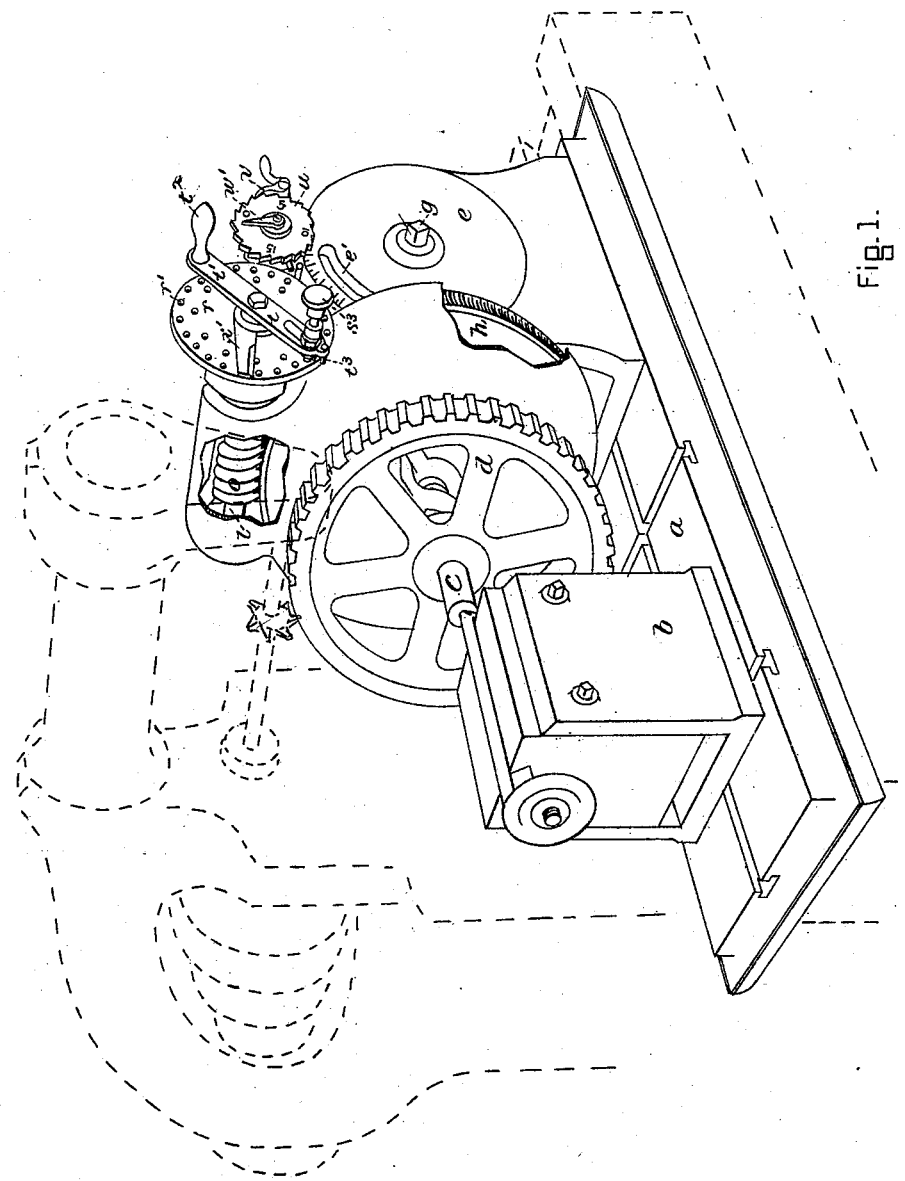

(No Model.) 4 Sheets—Sheet 1.

A. H. BRAINARD.
GEAR CUTTING MACHINE.

No. 273,451. Patented Mar. 6, 1883.

WITNESSES.
Henry Chadbourn.
Sarah M. Goodrich

INVENTOR.
Amos H. Brainard.
by
Urban Andrew
his atty.

(No Model.) 4 Sheets—Sheet 2.

A. H. BRAINARD.
GEAR CUTTING MACHINE.

No. 273,451. Patented Mar. 6, 1883.

WITNESSES.
Henry Chadbourn
Sarah M. Goodrich

INVENTOR.
Amos H. Brainard
by Alvan Andrew, his atty.

(No Model.) 4 Sheets—Sheet 3.

A. H. BRAINARD.
GEAR CUTTING MACHINE.

No. 273,451. Patented Mar. 6, 1883.

WITNESSES.
Henry Chadbourn
Sarah M. Goodrich

INVENTOR.
Amos H. Brainard
by Alban Andrew
his atty.

(No Model.) 4 Sheets—Sheet 4.

A. H. BRAINARD.
GEAR CUTTING MACHINE.

No. 273,451. Patented Mar. 6, 1883.

WITNESSES.
Henry Chadbourn
Sarah M. Goodrich

INVENTOR.
Amos H. Brainard
by
Allan Andrew
his atty.

UNITED STATES PATENT OFFICE.

AMOS H. BRAINARD, OF HYDE PARK, MASSACHUSETTS.

GEAR-CUTTING MACHINE.

SPECIFICATION forming part of Letters Patent No. 273,451, dated March 6, 1883.

Application filed May 29, 1882. (No model.)

*To all whom it may concern:*

Be it known that I, AMOS H. BRAINARD, a citizen of the United States, residing at Hyde Park, in the county of Norfolk and State of Massachusetts, have invented certain new and useful Improvements in Gear-Cutting Attachments for Milling-Machines; and I do hereby declare that the same are fully described in the following specification and illustrated in the accompanying drawings.

This invention relates to improvements in gear-cutting attachments for milling-machines; and it consists, first, in an improved mechanism for adjusting the worm-shaft which actuates the toothed worm-wheel, so that the contact of the worm and the teeth in the worm-wheel shall be perfect and without any backlash whatever, in order to avoid lost motion of the worm-wheel, no matter how slightly the worm-shaft is turned in either direction.

The invention consists, further, of an improved counting or registering device, which is automatically actuated by the turning of the handle or lever that carries the dial-pin in such a manner as to turn a toothed and graduated index-wheel one tooth for every revolution of the aforesaid handle or lever, and to be held in such position by a pawl until the lever is again turned a revolution with the worm-shaft, to which it is attached. The said graduated index-wheel is loose on a stationary pin or stud, to the outer end of which is secured a stationary index-finger or pointer, and by these means an automatic and accurate count is indicated of the number of revolutions which the worm-shaft has, and thus preventing mistakes in spacing the teeth to be cut on the gear-wheel and obviating the necessity of the operator carrying the number of revolutions made in his memory. The said graduated toothed index-wheel is turned against the influence of a spring, so that it will return against a stop to its zero position as soon as the pawl is released by the operator, such pawl being normally held in contact with the index-wheel by means of a suitable spring.

The invention further consists of an improvement in the lever which operates the worm-shaft, such improvement consisting, in combination with the usual slotted lever which carries the dial-pin, of an extension provided with a crank-handle by which the worm-shaft is turned. This has been done heretofore by taking hold of the knob on the dial-pin itself, such operation being objectionable, as turning by the dial-pin knob is liable to cause the dial-pin to disengage from its raised position above the dial and to lock prematurely in the holes on the dial-plate, which is both annoying and time-consuming. Such objection is entirely overcome by my improvement, as by its means the dial-pin knob is only manipulated to engage and disengage the dial-pin with and from its stationary dial, the turning of the worm being done by manipulation of the crank-handle on the lever-extension, as will herein be more fully shown and described, reference being had to the accompanying drawings, on which—

Figure 2:
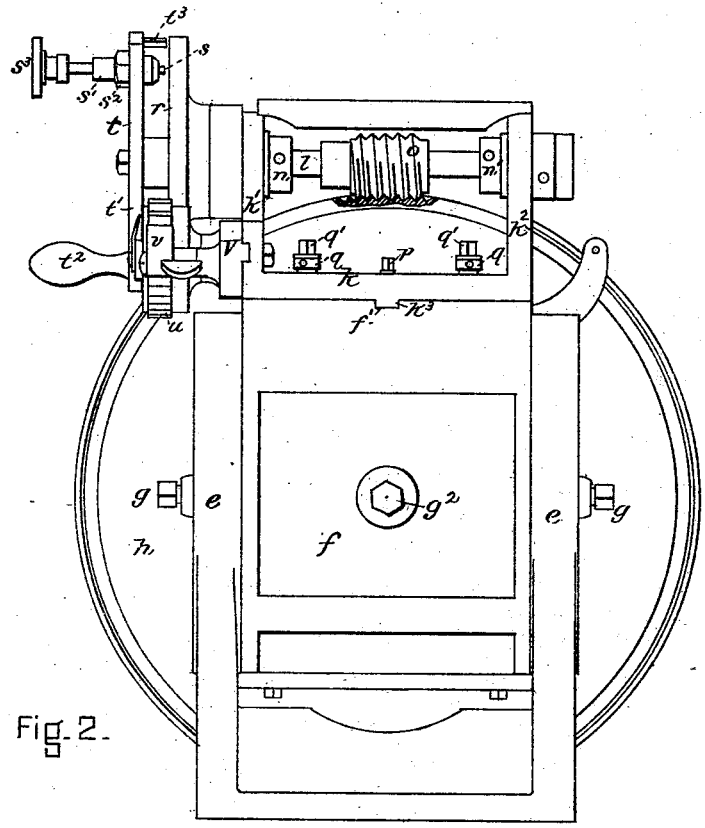
Figure 3:
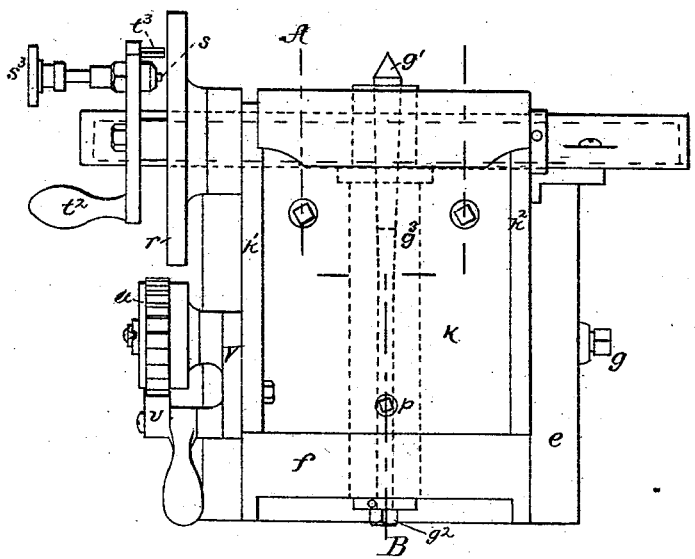
Figure 4:
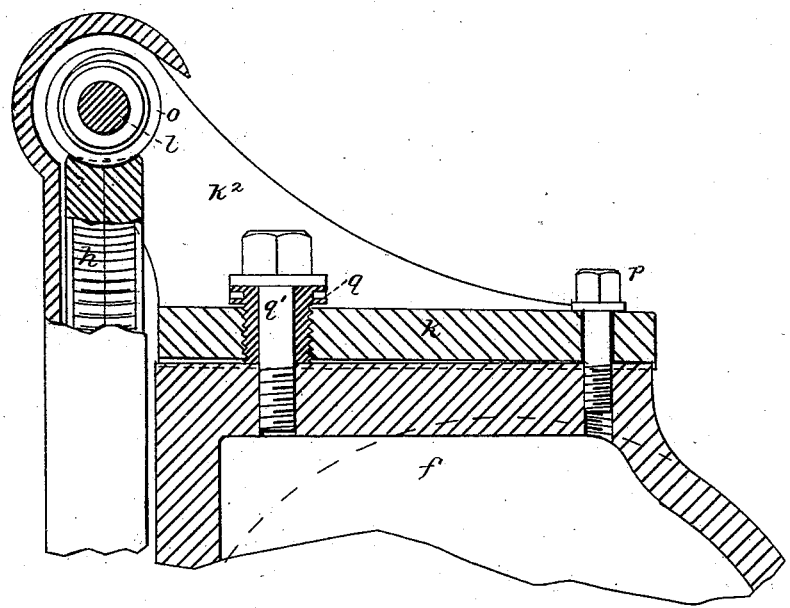
Figure 5:
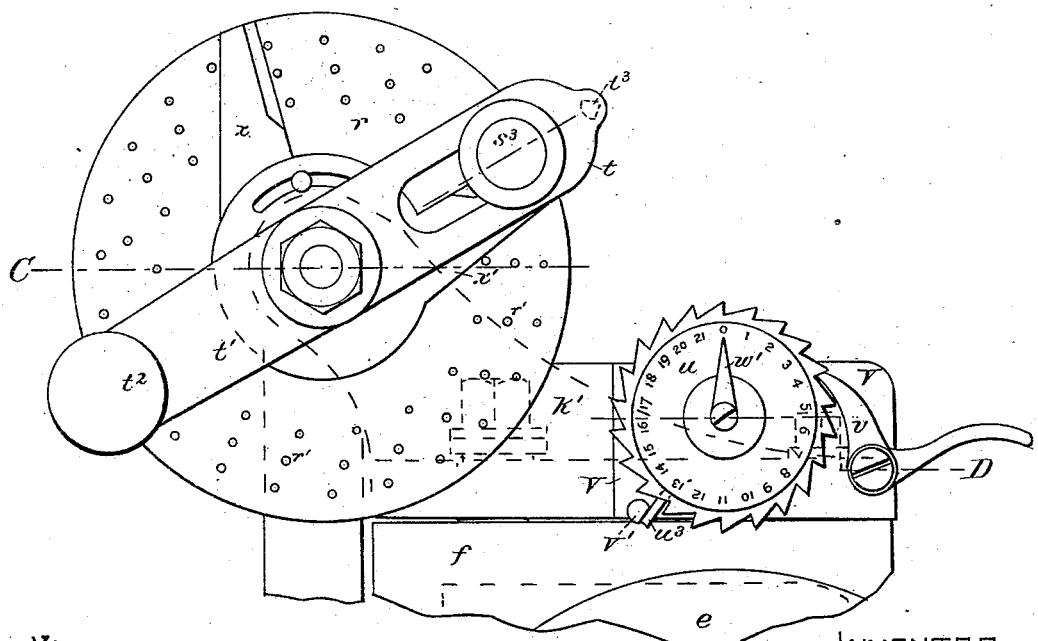
Figure 6:
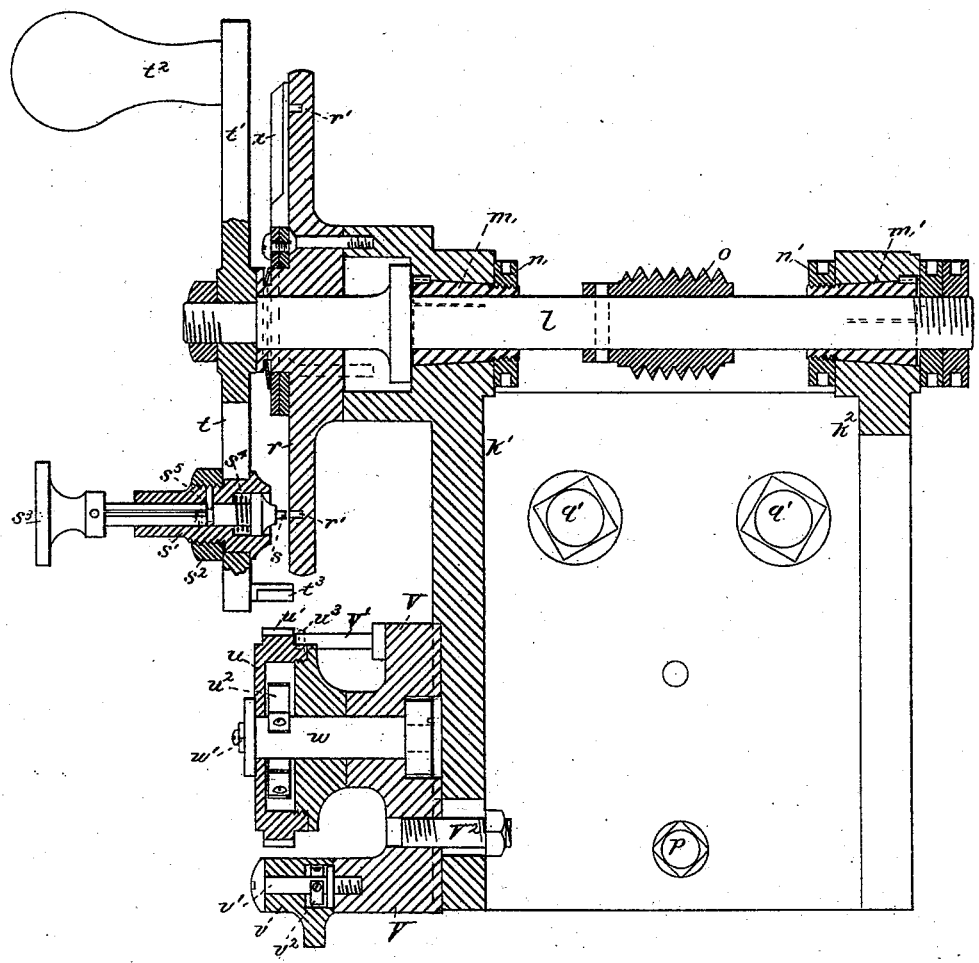

Figure 1 represents a perspective view of the invention as applied to a universal milling-machine, shown in dotted lines in said figure. Fig. 2 represents a rear view. Fig. 3 represents a plan view. Fig. 4 represents an enlarged cross-section on the line A B shown in Fig. 3. Fig. 5 represents an enlarged side view of the automatic counting or registering device, and Fig. 6 represents an irregular horizontal section on the line C D shown in Fig. 5.

Similar letters refer to similar parts wherever they occur on the different parts of the drawings.

$a$ in Fig. 1 represents the usual horizontally and vertically adjustable bed or table of a milling-machine, on which $b$ is the back center for the shaft $c$, to which the gear $d$ that is to be cut is secured, as usual.

$e\ e$ is the frame of the swinging head $f$, which latter is adjustable and swings on fulcrum-screws $g\ g$, as usual, to adapt it to the required incline of the teeth to be cut. The head $f$, after being adjusted to the desired position, is secured by means of a set-screw passing through the curved slot-hole $e'$ in the frame $e$, in the usual manner.

$g'$ is the center projection of the spindle $g^3$, which passes through the head $f$, as usual. Such center projection serves as a support for the shaft $c$, in the ordinary way.

$h$ is the usual worm-wheel, secured to the forward end of the spindle $g^3$, the latter being free to turn in the head $f$, and held in place by means of nut $g^2$, as usual, as shown in Fig. 3.

On the top of the head $f$ is located the plate $k$, which has cast in one piece with it the brackets $k'$ and $k^2$, in which are bearings for the worm-shaft $l$, provided with tapering bushings $m\ m'$ and adjusting-nuts $n\ n'$, as shown in Fig. 6.

$o$ is the worm, secured to the worm-shaft $l$, which worm is caused to engage with the teeth of the worm-wheel $h$, as shown in Figs. 1, 2, and 4. The manner of properly adjusting the worm $o$ for engagement with the teeth of worm-wheel $h$ is carried out as follows: A set-screw, $p$, passes through a hole in the rear of the plate $k$, and is screwed into the top of head $f$, as shown in Fig. 4. A pair of hollow screws, $q\ q$, pass through screw-threaded perforations in the end of plate $k$ nearest to the worm $o$, in such a manner that their lower ends are caused to rest on top of head $f$, as shown in Fig. 4. Through the central perforation in each of the hollow screws $q$ passes a set-screw, $q'$, the lower end of which is screwed into top of head $f$, as shown in Fig. 4, and thus it will be seen that the position of the worm $o$ in relation to the worm-wheel $h$ can be adjusted to the utmost nicety and accuracy simply by first loosening the rear set-screw, $p$, and if it is desired to adjust the worm $o$ a little nearer toward its worm-wheel $h$, I unscrew the set-screws $q'\ q'$ and hollow screws $q\ q$ just sufficiently to allow the worm $o$ to descend toward the wheel $h$, after which the set-screws $p$ and $q'\ q'$ are screwed up firmly to hold the plate $k$ rigidly secured to top of head $f$. A longitudinal projection, $k'''$, is made on the under side of the plate $k$ to fit in a corresponding recess, $f'$, on the top of head $f$, to retain the normal central relation of the worm $o$ to the worm-wheel $h$, as shown in Figs. 2 and 4.

$r$ is the usual dial wheel or plate, secured to the outer end of the bracket $k'$, as shown in Figs. 5 and 6, which dial is provided with a number of circular recesses or perforations, $r'\ r'$, as usual, for the reception of the end of the dial-pin $s$, which latter is located in the usual hollow sleeve, $s'$, provided with check-nuts $s^2$ to adjust it and secure it in position in the slot of the lever $t$, which is secured to the end of the worm-shaft $l$.

$s^3$ is the knob on the outer end of the dial-pin $s$, and $s^4$ is the coiled spring for automatically locking the inner end of dial-pin $s$ into any desired recess on the dial-plate $r$ when the dial-pin $s$ is released from its bayonet lock $s^5$, as usual.

The slotted lever $t$ is provided with a linear extension, $t'$, on the opposite side of the axis of the worm-shaft $l$, as shown in Figs. 1, 2, 3, 5, and 6, on which extension is a crank-handle, $t^2$, for the purpose set forth. The outer end of the slotted lever $t$ has a tooth or projection, $t^3$, secured to it, which is caused to come in contact with the teeth $u'$ of the index-wheel $u$ once per each revolution of said dial-lever $t$, and by this means said index-wheel $u$ is turned around its axis a distance equal to the pitch of its toothed circumference, and automatically held in such position by means of the pawl $v$, which is supported on the fulcrum-pin $v'$, screwed into the bracket V, and provided with a suitable spring, $v^2$, for automatically holding the said pawl $v$ in contact with the toothed circumference of the index-wheel $u$, which latter is loosely supported on the stud $w$, secured to bracket V, and provided in its interior with a coiled spring, $u^2$, one end of which is fastened to the stud $w$ and the other end to the wheel $u$, by which arrangement the latter is caused to turn to its zero position, as shown in Fig. 5, by releasing the pawl $v$ from contact with the teeth $u'$, and to remain at such zero position by the radial projection $u^3$ on the wheel $v$ coming in contact with the rigid stop projection V', secured to bracket V. The face of the index-dial $u$ is graduated to correspond with the number of its teeth, as shown in Fig. 5; and to the stationary stud $w$ is secured the index-finger or pointer $w'$, as shown in said Fig. 5. The bracket V is secured to the plate $k$ by means of the screw $V^2$, as shown in Fig. 6.

It will thus be seen that an automatic and correct count is self-registered on the index-wheel $u$ for every revolution of the lever $t$ and its worm-shaft $l$, and by this means mistakes in counting are entirely avoided, as the operator can see at a glance whether he has turned the worm and worm-wheel too much or too little, and governs himself accordingly.

X and X are the usual spacers, adjustable on the face of the notched or perforated dial $r$, as usual.

Having thus fully described the nature, construction, and operation of my invention, I wish to secure by Letters Patent and claim—

1. The herein-described mechanism for adjusting the worm-shaft $l$ to the worm-wheel $h$, consisting of the plate $k$, adjustable upon the swinging block $f$ by means of hollow screws $q\ q$ and their central set-screws, $q'\ q'$, as and for the purpose set forth.

2. The combination, with the dial and toothed dial-lever $t$, of the registering device, consisting of plate or frame V, toothed and graduated wheel $u$, its spring $u^2$, spring-pawl $v\ v^2$, the stationary pointer $w'$, and zero-stops $u^3$ V', as and for the purpose set forth.

3. In combination with the worm-shaft $l$ and its lever $t$, and projection $t^3$, the registering device, consisting of frame V, toothed and graduated wheel $u$, its spring $u^2$, spring-pawl $v\ v^2$, stationary pointer $w'$, and zero-stops $u^3$ V', as and for the purpose set forth.

4. The combination, with the stationary dial $r$, of the worm-shaft $l$ and dial-pin $s$, the slotted lever $t$, extended beyond the center of the worm-shaft $l$ to form an arm, $t'$, having a crank-handle $t^2$, substantially as described.

In testimony whereof I have affixed my signature in presence of two witnesses.

AMOS H. BRAINARD.

Witnesses:
ALBAN ANDRÉN,
HENRY CHADBOURN.